3,535,078
PROCESS FOR THE PRODUCTION OF SODIUM HYDRIDE
Stanislav Landa, Bedrich Lebl, Jiri Mostecky, and Vladimir Prochazka, Prague, Jiri Stuchlik, Srby, and Jaroslav Vit, Prague, Czechoslovakia, assignors to Ceskoslovenska Akademie Ved, Prague, Czechoslovakia
No Drawing. Filed Mar. 1, 1968, Ser. No. 709,822
Claims priority, application Czechoslovakia, Mar. 29, 1967, 2,267/67
Int. Cl. C01b 6/04
U.S. Cl. 23—204                                      9 Claims

ABSTRACT OF THE DISCLOSURE

A process for the production of sodium hydride in which molten sodium is reacted with gaseous hydrogen at a temperature between 220 and 400° and elevated pressure, with stirring, in the presence of carbon monoxide in an amount of $10^{-3}$ to $5 \times 10^{-2}$ moles per gram atom of sodium.

SUMMARY OF THE INVENTION

This invention relates to a process for the industrial production of sodium hydride by the direct interaction of molten sodium with hydrogen gas, with high-speed stirring, at elevated temperature and pressure wherein the reaction is carried out in the presence of carbon monoxide or substances generating the same under the reaction conditions until the interaction between the sodium and hydrogen gas is substantially complete.

The alkali metal hydrides have recently achieved considerable importance, especially as starting material for the industrial production of complex hydrides, since complex alkali metal hydrides, and particularly lithium or sodium complex hydrides have found many applications. Furthermore, complex alkali metal hydrides are also powerful reducing agents in organic chemical processes. Many of the reactions of the simple hydrides with inorganic substances have a course similar to that of the reactions of the corresponding free metal, except that hydrogen is liberated. This indicates the mechanism of the reaction as being due to initial dissociation of the hydride under formation of the metal in a highly reactive form, which then takes part in the actual reaction. Because of the high hydrogen content in a small volume they also have been suggested as rocket fuels and the like.

The usual method of preparing of sodium hydride is a direct combination of sodium with hydrogen gas at elevated temperatures and pressures. After the molten sodium has been charged into the hydrogenating apparatus and the desired hydrogen pressure has been provided, in a standard manner, the temperature of both materials is increased to the temperature of hydrogenation, until hydrogenation of the sodium in a finely divided state is achieved, for instance, with vigorous stirring, or by carrying out the reaction in an inert liquid medium with high-speed stirring.

Even then, the reaction once initiated proceeds only very slowly and after having proceeded for a short period of time, this prior art reaction stops for several reasons. First of all, the reaction starts on the surface and produces a solid coating on the inner wall of the apparatus which prevents the heat transmission, thus making the consumption of hydrogen incomplete unless special means are employed. Secondly, all surface contaminations must be removed in advance, since even a very thin layer of oxide, nitride or hydride on the surface of the drops of molten sodium will act as a barrier for the penetration of hydrogen into the metal drops. Then again, the rate of the diffusion of hydrogen may be too slow, so as to be impractical. Additionally, the reaction sometimes stops because the volume contraction, resulting from the hydrogenation, causes a dense protective coating of hydride to be formed on the surface of the molten metal. Diffusion of hydrogen through such a hydride layer, in order to react with the underlying metal, is extremely slow. To increase the temperature so as to increase the diffusion rate entails the risk of decomposing the product. In order to make the reaction proceed to completion, several techniques have been used. One method consists in hydrogenation of a fine dispersion of sodium in an inert liquid, such as mineral oil. According to another technique, the metal is volatilized, and the reaction between sodium and hydrogen is carried out in the vapor phase, the solid hydride being deposited on the cold walls of the reaction vessel. Complete reaction has also been obtained under high pressure of hydrogen using high-speed stirring by bubbling hydrogen through molten sodium or by the use of various organic substances as catalysts. But even in the presence of the catalysts that have been hitherto known, the reaction between sodium and hydrogen proceeds slowly, since no hydrogenation catalyst has been hitherto known that has specific accelerating properties. As a rule, a residual portion of sodium is found in the product thus obtained, amounting to about 8% by weight. This requires purification of the final hydrogenation product by a further treatment, as for instance by pulverizing the product by means of iron balls and the like.

It is an object of the present invention to provide an improved catalytic method for the production of sodium hydride, wherein the mutual reaction of the metal with hydrogen proceeds in the presence of specific catalysts with an initial reaction rate higher than what has been hitherto the case, thus permitting the method to be continuously performed on an industrial scale, without making use of oversized reactor bodies which are undesirable from the industrial point of view.

It is a further objective of the present invention to provide for such a course of the reciprocal interaction between sodium and hydrogen through which—in the presence of a specific catalyst—a product of industrial grade purity is obtained, which is constituted, in entirety, of semicoloidal finely divided particles, whereby the thus obtained product does not require any additional purification, and can be directly used in its prospective chemical applications.

The present invention is defined as an industrial method for the production of sodium hydride by direct interaction of molten sodium and gaseous hydrogen, with stirring, and at elevated temperatures and pressures, wherein the reaction is carried out in the presence of carbon monoxide. The amount of the carbon monoxide used is preferably in the range between $10^{-3}$ and $5 \times 10^{-2}$ moles of carbon monoxide per gram atom of the molten metal. The reaction time required for carrying out the said reaction, is the time necessary to permit the product to be formed in hydride form with a specific surface of 0.5 to $3.5 \text{m.}^2\text{g}^{-1}$, i.e., a particle size in the range between 1.2 and $8.5\mu$.

It is practical to heat the reaction mixture to temperatures in the range between 220 and 400° C., preferably between 220 and 360° C. at elevated pressures, preferably in the range between 6 and 200 atmospheres. The stirring and the heating are discontinued as soon as the particle size of the product attains an average value of 1.2 to $8.5\mu$.

Since any direct measurement of the particle size of the product is hardly practicable during the reaction, and since the time required for a quantitative conversion of sodium into sodium hydride with a definite average particle size is dependent on the reaction conditions, the reaction time has to be determined empirically in advance.

Generally, the necessary reaction time is between 0.5 and 2 hours for a discontinual production.

It is most advisable to introduce carbon monoxide, as such, into the reactor, preferably, together with the hydrogen. The realization of the influence exerted by the presence of carbon monoxide upon the direct synthesis of sodium hydride was discovered by observance of the surprising fact that hydrogen gas having been produced by conversion of water gas in winter would afford a sintered, or at the best, a coarsely grained product, whereas during summer months, a quantitative yield on sodium hydride with a large specific surface would be obtained with hydrogen obtained by exactly the same technology. Consequently, the technology of the hydrogen production itself became a matter of a thorough study which revealed the fact that in summer, carbon monoxide is less effectively removed from hydrogen; this fact has been verified by addition of carbon monoxide to the said "summer hydrogen." The so treated hydrogen resulted in the production of sodium hydride with a large specific surface. It would seem, offhand, that hydrogen, containing "natural" carbon monoxide, would afford better results than hydrogen, to which carbon monoxide has been added only for the purpose.

It was shown only later that hydrogen would mix with carbon monoxide but very slowly; a homogeneous mixture does not result prior to a three week period. That is also why a freshly prepared mixture of hydrogen and carbon monoxide is less suitable for sodium hydride manufacture than hydrogen containing carbon monoxide uniformly mixed with the former, the both gases having been obtained as a uniform gaseous body through water gas shift reaction.

Another embodiment of the present invention, however, is also practicable, wherein carbon monoxide is formed, in the desired quantity, in the pressure vessel from its precursors. By precursors are here meant to denote any such compounds that, under the respective reaction conditions, will liberate carbon monoxide. The compounds that fall within the scope are, for example, formates, orthoformates, oxalates or acetoacetates. The following are considered as especially active in this respect: methyl formate, ethyl orthoformate, and ethyl oxalate.

The process of the present invention may be either carried out in a liquid media that is exclusively formed by molten sodium, or, it may be carried out in the presence of an inert medium which, under the reaction conditions, is liquid.

Whenever it is deemed advisable to use an inert liquid medium, aliphatic or aromatic liquids may be used in this capacity, with the provision that they are stable under the respective reaction conditions, i.e. crue oil, or mineral oil, etc. The presence of any inert media, however, is by no means necessary to permit the reciprocal interaction of the reactants, and preferably the reaction is carried out without the use of any such media. If it is desirable to provoke an increased effectivity of the reaction by promoting a more intimate contact between the reactants and the catalyst using an inert medium, aliphatic or aromatic hydrocarbons are usually used for this purpose, such as crude oil or mineral oil, as mentioned above.

The ratios of the reactants, and the industrial conditions of hydrogenation may vary considerably. As a rule, sodium is used in stoichiometric amount even when sodium hydride in the product contains a portion of hydrogen smaller than theoretical; but since this deviation from stoichiometry is less pronounced than with the metalic hydrides, it may be disregarded with sodium hydride.

DESCRIPTION OF THE PREFERRED EMBODIMENTS

The examples which follow show some of the practical embodiments of this invention. They are only illustrative without limiting the invention to the specific details given therein.

EXAMPLE 1

A 40-liter pressure vessel was flushed with nitrogen to remove air and moisture and preheated at 200° C. 6.9 kg. (300 gram atoms) of molten sodium is introduced into the vessel by means of a solution metering pump while simultaneously stirring. Subsequently, the pressure vessel is filled with hydrogen containing 16.8 g. (0.6 mole) of carbon monoxide so as to build up a pressure of 35 atmospheres and the temperature is further increased to attain an initial reaction temperature of 260° C. Thereafter, the temperature is held within the range between 260° and 320° C.

From a hydrogen cylinder manifold, hydrogen is introduced through a pressure regulator, which contains 1% by volume of carbon monoxide, so as to maintain a constant pressure in the pressure vessel, amounting to between 40 and 50 atmospheres. The course of the reaction may be traced from the consumption of hydrogen and may be readily evaluated from the pressure drop in the manifold. The sodium melt is fed continuously into the pressure vessel, to keep a constant level. To permit the reaction to proceed duly, the product must be discharged from the pressure vessel in a continuous manner, e.g. by means of a vibrating trough that separates the product from the melt and conveys the former by the action of vibrating into an overflow pipe, through which pipe the product is further conveyed into a separated collector. One possible embodiment of such a reactor is shown in U.S. application 638,302 assigned to the same assignee herein. In the collector, approximately 30 kg. of sodium hydride is collected in 1 hour. The product collected is pneumatically discharged from the collector, which, is performed only intermittently, subsequent to momentary discontinuance of the supply of hydrogen and sodium. The method, as a whole, may be carried out in a continuous fashion as long as the heat transfer is not seriously hindered by the sintered hydride layer which will gradually develop on the inner wall of the pressure vessel in a manner similar to vitreous slag. When this is the case, the pressure vessel has to be disconnected, cleaned out, and first then put into service again.

EXAMPLE 2

Into a 2.5-liter rotary pressure vessel, 100 g. of sodium metal and 2 g. of ethyl orthoformate are introduced, and six iron balls are utilized in the vessel for stirring of the reaction mixture. The pressure vessel is closed, flushed with hydrogen, and electrolytic hydrogen is fed thereinto to build up a pressure of 150 atmospheres. For 1.5 hours, the reaction mixture is heated to 360° C., and for an additional 30 minutes, the pressure vessel is cooled, the unaltered gas is blown off and the vessel is flushed with nitrogen. Then the pressure vessel is opened. The product is poured out through a screen to separate the steel balls; 100 g. of a product is obtained in the form of a white voluminous powdered sodium hydride having an average particle size of $5\mu$.

EXAMPLE 3

Into a 40-liter rotary pressure vessel, flushed with nitrogen, there is introduced, 6.9 kg. (300 gram atoms) of sodium, 16.8 g. (0.6 moles) of carbon monoxide and electrolytic hydrogen to build up a pressure of 140 atmospheres. The vessel is heated to the temperature of hydrogenation, while being driven in rotation at 80 r.p.m. At 220° C. an exothermic reaction takes place with considerable hydrogen consumption. In about 35 minutes, the reaction temperature rises to 320° C. and the consumption of hydrogen ceases. Upon cooling to the ambient temperature, the unaltered hydrogen is blow off, the pressure vessel is flushed with nitrogen and the product is poured out and weighed; 6.8 kg. of white powdered hydride of 98.5% purity is obtained having an average active surface of 2.45 m.$^2$g.$^{-1}$ according to Blaine, which corresponds to an average particle size of 1.9$\mu$. The yield is 94.5% of theoretical and the residue (5.5%) remains in the pressure vessel, and in no way will manifest itself in the runs to follow.

EXAMPLE 4

Into a 300-liter pressure vessel provided with a stirrer, 200 liters of a suspension of sodium in paraffin oil Bayol-85 is introduced, which suspension is 20% by weight, having been prepared from its components in a hydrodynamic ultrasonic homogenizer. The pressure vessel is flushed with electrolytic hydrogen, and, subsequently, hydrogen, containing 0.3% by volume of carbon monoxide is introduced into the vessel through a throttle valve, adjusted to a pressure of 40 atmospheres. The vessel is heated whie the mixture is vigorously stirred. At 240° C., the consumption of hydrogen commences and the reaction is completed at 320° C. in a period of 45 minutes. The resulting suspension is discharged through a cooler into a collecting vessel. 177 liters of a sodium hydride oil suspension is obtained, which is substantially free of metallic sodium, the sodium hydride present in the suspension having an average particle size of 1.2$\mu$. The residue in the pressure vessel, will not manifest itself in the runs to follow. The suspension obtained is thixotropic and highly reactive.

EXAMPLE 5

This example was carried out in a manner identical to that of Example 2, with the sole exception that 2 g. ethyl oxalate were used instead of 2 g. ethyl orthoformate. The results were the same as in Example 2.

EXAMPLE 6

Into a through-flow pressure vessel comprising a 300-liter pressure vessel provided with a stirrer, a bypass for circulatory conveyance of the reaction mixture and for simultaneous withdrawal of the reacted suspension, 200 liters of a 20% by weight sodium suspension (the same as that of the Example 4) are introduced. The reactor is flushed with electrolytic hydrogen and 250 ml. (4 moles) of methyl formate is introduced thereinto. The temperature is increased to 280° C., while building up a constant pressure of hydrogen to 40 atmospheres, in the pressure vessel. The actual reaction takes about 1 hour, within which time period, consumption of hydrogen proceeds. Subsequently, an additional supply of sodium oil suspension is introduced into the reactor, in a quantity of 265 liters per hour, with 330 ml. of methyl formate per hour. Through the bypass, the resulting suspension is withdrawn at about the same rate at which the starting suspension is being introduced. The temperature and the pressure are kept at the same levels; 265 liters of a suspension is thus obtained per hour with a content of 97.8% of sodium hydride in the solid phase, having an average particle size of 1.2$\mu$.

What is claimed is:

1. A method for producing sodium hydride comprising directly reacting molten sodium and gaseous hydrogen, under stirring, at elevated temperature and pressure in the presence of from $10^{-3}$ to $5 \times 10^{-2}$ moles of carbon monoxide per gram atom of motlen sodium.

2. A method as claimed in claim 1, wherein the reaction mixture is heated to a temperature between 220 and 400° C. and the heating is discontinued when the average particle size of the product is between 1.2 and 8.5$\mu$.

3. A method as claimed in claim 1, wherein the reaction is carired out in the presence of a compound that will produce the required amount of carbon monoxide under the reaction conditions which prevail.

4. A method as claimed in claim 3, wherein said compound which produces carbon monoxide is a formate or an oxalate.

5. A method as claimed in claim 3, wherein said compound which produces carbon monoxide is methyl formate, or ethyl oxalate.

6. A method as claimed in claim 1, wherein the reaction is carried out in an inert liquid medium.

7. A method as claimed in claim 6, wherein said inert liquid medium is a mineral oil.

8. A method as claimed in claim 7, wherein the reaction is carried out at a temperature between 220 to 360° C. and at a pressure between 6 and 200 atmospheres.

9. A method as claimed in claim 1, wherein said carbon monoxide and hydrogen are uniformly mixed prior to the reaction of the hydrogen with the sodium.

References Cited

UNITED STATES PATENTS

| 2,425,711 | 8/1947 | Alexander | 23—204 |
| 2,768,064 | 10/1956 | Baldridge | 23—204 |
| 2,884,311 | 4/1959 | Huff | 23—204 |

GEORGE O. PETERS, Assistant Examiner